United States Patent [19]

Smith

[11] 4,086,769

[45] May 2, 1978

[54] COMPOUND MEMORY ENGINE

[75] Inventor: Warren K. Smith, Poway, Calif.

[73] Assignee: The United States of America as represented by the Secretary of the Navy, Washington, D.C.

[21] Appl. No.: 578,553

[22] Filed: May 19, 1975

[51] Int. Cl.² ............................................. F03G 7/06
[52] U.S. Cl. .................................................... 60/527
[58] Field of Search ................... 60/527, 531, 23, 25, 60/528, 529; 337/393; 73/378.3; 169/19; 137/79; 251/11; 75/170

[56] References Cited

U.S. PATENT DOCUMENTS

| | | | |
|---|---|---|---|
| 3,303,642 | 2/1967 | Lee | 60/527 X |
| 3,316,415 | 4/1967 | Taylor | 60/529 X |
| 3,403,238 | 9/1968 | Buehler et al. | 60/527 X |
| 3,430,441 | 3/1969 | Adams | 60/529 |
| 3,699,769 | 10/1972 | Bondurant | 60/527 |
| 3,754,151 | 8/1973 | Clark | 60/527 X |
| 3,786,631 | 1/1974 | Manning et al. | 60/641 |
| 3,913,326 | 10/1975 | Banks | 60/527 |

*Primary Examiner*—Allen M. Ostrager
*Attorney, Agent, or Firm*—R. S. Sciascia; Roy Miller; W. T. Skeer

[57] ABSTRACT

A mechanism for transforming heat energy into mechanical energy capable of utilizing heat from low temperature sources such as solar heated water, geothermal hot water and rejected heat from conventional engines. The mechanism uses a series of elements manufactured from a nickel-titanium alloy. These elements are formed into a particular shape called the memory shape and, when mechanically deformed, may be instantly returned to the memory shape by the application of heat.

6 Claims, 3 Drawing Figures

COMPOUND MEMORY ENGINE

GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

Nickel-titanium alloys useful in practicing the present invention are more fully described in Assignee's prior application Ser. No. 157,049 filed Dec. 1, 1961, and now U.S. Pat. No. 3,174,851. One method for converting heat energy into mechanical energy utilizing the properties of such a nickel-titanium alloy are disclosed in Assignee's prior application Ser. No. 540,422 filed Apr. 5, 1966, now U.S. Pat. No. 3,403,238.

BACKGROUND OF THE INVENTION

Conventional heat engines use compressible gas or vapor at high temperatures and pressures to obtain reasonable Carnot thermal efficiencies. The high temperature heat source is usually obtained from combustion of a fuel. However, there are very large sources of heat energy available at temperatures too low for efficient use in these engines. The discovery of the shape memory properties of the Ni-Ti alloy known as 55-Nitinol in 1962 opens the possibility of a solid state heat engine that can operate at quite low temperatures. The alloy can be plastically deformed to a limit of about 8% while in the low-temperature, low-strength phase, and then heated only 15° or 20° F to cause it to transform into another crystal structure with a strength several times greater. In addition, when the metal transforms, it "remembers" its original shape and attempts to return to it with the greater force. Upon cooling through the transformation range, the alloy regains its lower strength condition. Such an engine operating, for example, with a transformation temperature range (TTR) of 85°–70° F would have a Carnot thermal efficiency of only $$\frac{(85 + 460) - (70 + 460)}{85 + 460} = 2.75\%.$$

SUMMARY

Another interesting property of Nitinol is that the TTR may be varied from $-100°$ to about 300° F by small changes in composition. This invention seeks to take advantage of such a property to build a compound or multi-stage engine using a series of working Nitinol elements with TTR's varying in 15° F steps. For example, a 12-stage engine working between 280° and 70° F would have a Carnot thermal efficiency of 28.3%.

Research work referenced in NASA SP-5110 indicates that the TTR is greatly widened if the Nitinol is restricted by load from returning to its original shape upon heating. This would appear to block the possibility of multiple stages in an engine. However, more study by the inventor has indicated that the widening of the TTR is caused when the alloy is restrained at 8% deformation, for example, and heated until it is completely transformed. The solution of this problem (a part of this invention) to make possible the compound engine is the use of a load-limiting device in the power transmitting train from the engine. Any force or torque limiting device, such as by friction, magnetic or hydraulic slippage, may be used.

DESCRIPTION AND OPERATION

Figure 1:
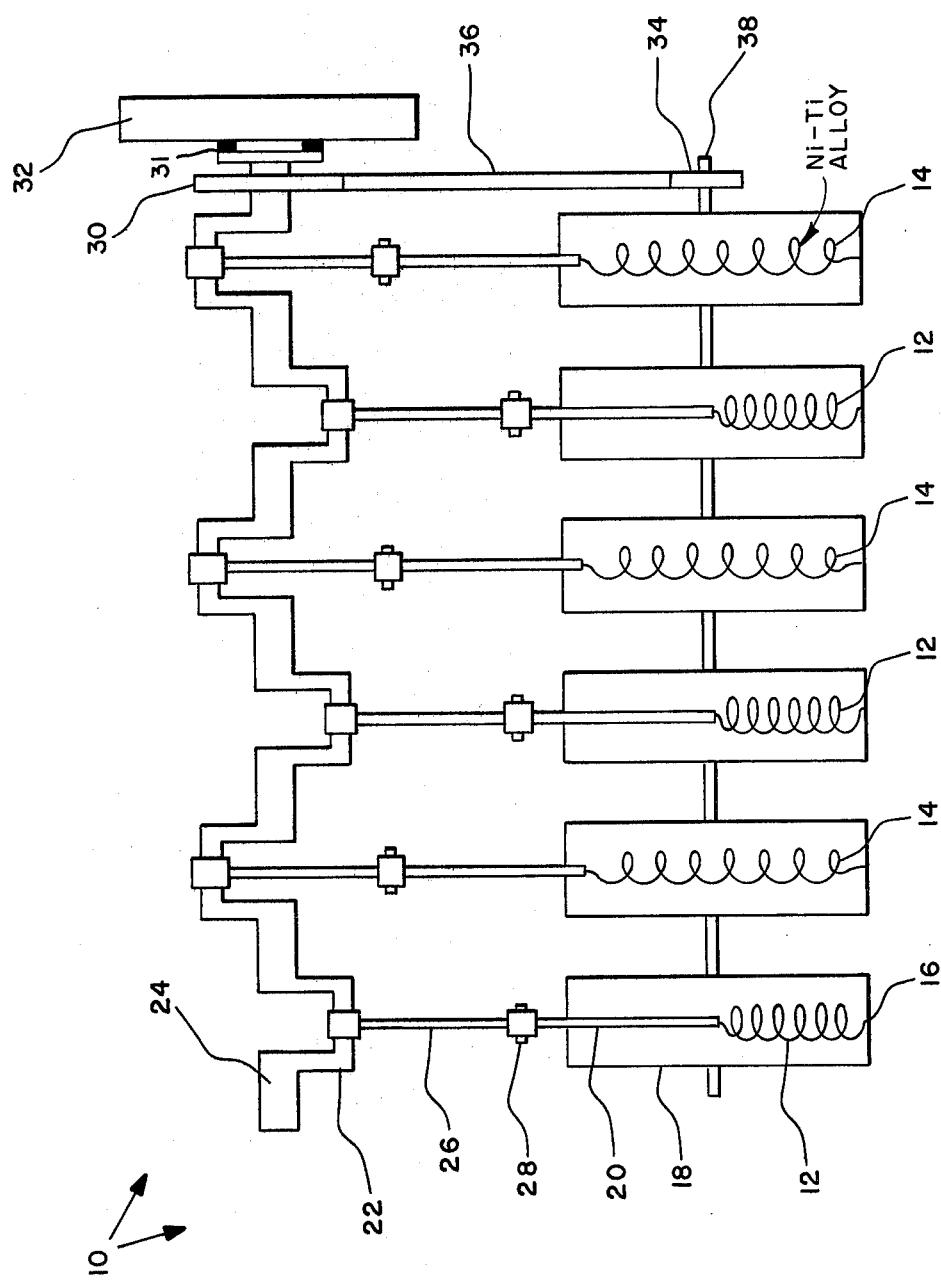
FIG. 1 is a simplified schematic plan view of an engine according to the present invention.

A simple engine for utilizing the properties of Nitinol to convert heat energy into mechanical energy is indicated generally by the numeral 10 in FIG. 1. In the embodiment shown, work elements of Nitinol in the shape of coil springs are used and those Nitinol elements which are in their "memory" position are indicated by the numeral 12 and the Nitinol elements which have been mechanically extended are indicated by the numerals 14. All of the Nitinol elements 12, 14 have been originally heat treated to the memory shape of the elements marked 12. One end of each spring-like element is attached as indicated at 16 to the back wall of a chamber 18, while the other end is attached to a plunger rod 20. The other end of plunger rod 20 is connected to the crank 22 of a crankshaft 24 by means of a connecting rod 26 pivoted to the rod 20 by a wrist bearing 28.

Crankshaft 24 carries on one end a pulley 30 and a flywheel 32 and the pulley 30 is in turn connected to a pulley 34, for example, by a V-belt 36. A torque limiting coupling may advantageously be included, for example, between shaft 24 and pulley 30.

A conventional friction drive is indicated at 31. This pulley and belt arrangement is adapted to drive a series of pumps, valves or other control means through mechanisms attached to a control shaft 38 as will be further described below.

As shown in FIG. 1 spring-like elements 12, 14 in the chambers 18 alternate between fully contracted (12) and fully extended (14). By fully extended is meant a limit of 8% (or better conservatively 6%) outer fiber strain. The controls on shaft 38 are preferably so arranged that cold water is supplied in each chamber immediately after the element is fully contracted. As the crankshaft 24 turns through 180°, each contracted element is stretched and by the end of the stretch the cold water is dumped and hot water is added in its place. This instantly transforms the Nitinol to the high strength condition and activates its "memory" to return it to contracted shape, thus turning the crankshaft 180° with sufficient force to stretch the other Nitinol elements in the system and to do useful work.

Figure 2:
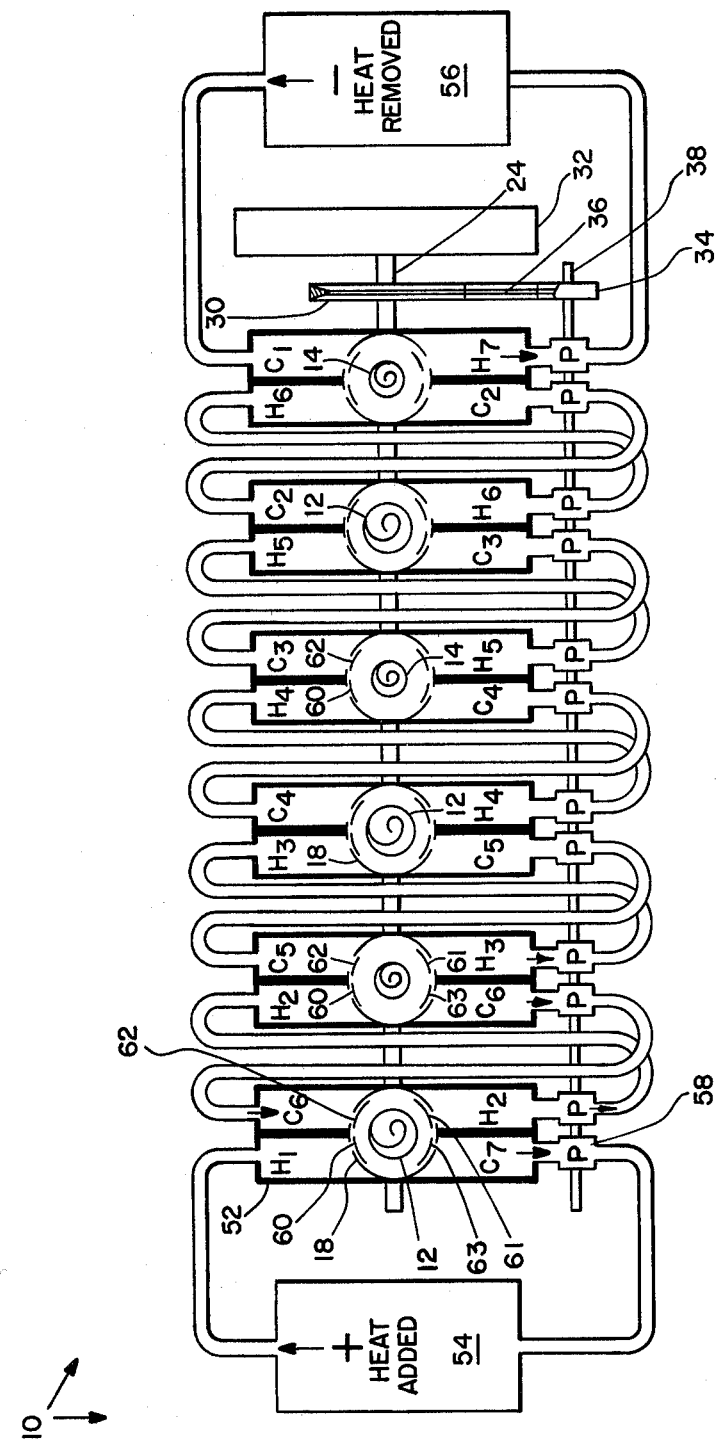
FIG. 2 is a schematic side elevational view of the engine of FIG. 1.

For superior thermal efficiency the engine may be constructed in a manner to give a counterflow cascade arrangement of hot and cold water to the chambers as shown in FIG. 2. As shown in FIG. 2, the Nitinol elements 12 and 14 are arranged in chambers 18 which are in contact with the water exchange system 52.

The four separate fluid chambers of water system 52 are connected respectively to hot and cold fluid sources 54, 56. Heat is added to the system at heat exchanger 54 and removed from the system at heat exchanger 56. Flow of the fluid through the system is controlled by pumps 58 driven by shaft 38 and the flow is regulated by valves operating within chambers 18.

Looking now at that chamber 18 and its associated reservoir system 52 which is nearest to the heat adding heat exchanger 54, it may be seen that the fluid reservoirs H1 and H2 are on opposing sides of the reservoir system 52. In order for fluid to flow from H1 to H2 the opposing valves 60, 61 must move in concert to admit flow through chamber 18. Flow from the cold fluid enters the chamber C6 and, in order for the cold fluid to flow through chamber 18 the opposing valves 62, 63 must be simultaneously opened to allow the cold fluid to exit through chamber C7.

Following the designations from H1 through H7 and conversly from C1 through C7, the flow of the hot and cold fluids respectively may be traced through the system. Of course, the pumps could be dispensed with altogether if separate hot and cold sources were available under pressure or movable by gravity.

Figure 3:
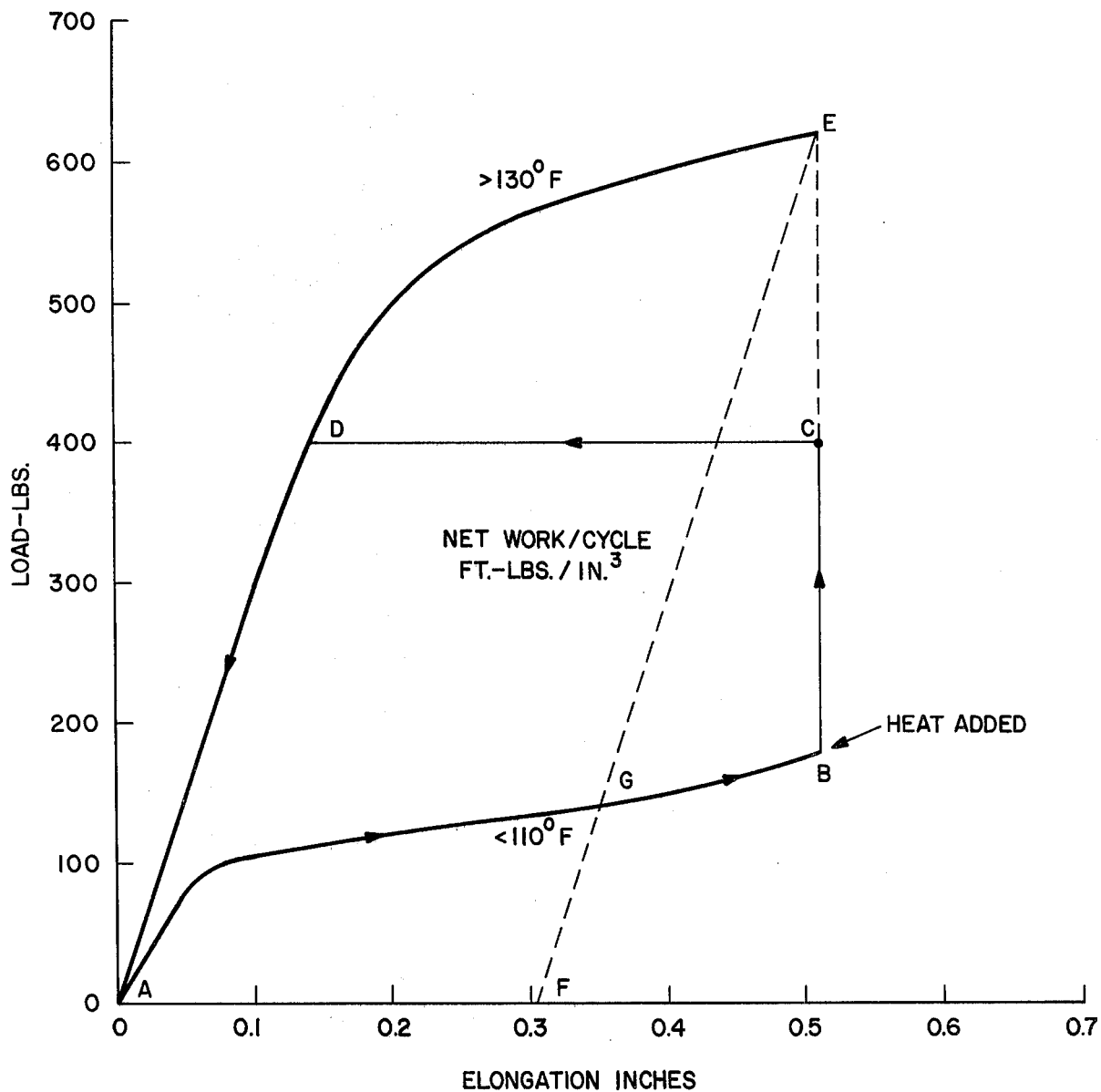
FIG. 3 is a graph representing the work diagram for a particular 55-Nitinol alloy.

FIG. 3 is a typical work diagram for a Nitinol alloy and particularly shows the net work per cycle in foot pounds per cubic inch of a particular nickel-titanium alloy designated as 55-Nitinol which merely means that the alloy contains 55% nickel and the remainder essentially titanium. The diagram was derived by stretching a strip of Nitinol at just under 110° F (TTR=110°-130° F) in a tensile testing machine while having the machine simultaneously and automatically draw a load vs. elongation curve AB. The load was removed and the strip heated to just above 130° F, which caused it to "remember" to return to A. Then the strip at 130° F was loaded until it stretched to E and automatically drew AE. (Of course, unloading it now caused it to go to F with a permanent stretch of AF). From these curves the useful work pathway may be deduced. Since a useful pathway must leave no permanent stretch or deformation such as AF, which would damage the machine, the necessary pathway of a cycle is therefore ABCDA. The net work available from a cycle may be calculated from the area bounded by ABCDA and expressed as ft.-lbs./in.$^3$. It is also obvious why a load-limiting device to avoid exceeding DC is necessary. Any force or torque limiting device, such as by friction, magnetic or hydraulic slippage may be used.

When using liquids, it has been calculated that entering hot liquid supplies should be 210° F so that when the liquid floods the element, which is at 180° F, the resultant average temperature will be the desired 195° F. Likewise, the entering cold fluid supply should be 90° F so that when it floods the element which is at 120° F, the resultant average temperature will be the desired 105° F. The quantity of water to be used at these temperatures is thus determined by the quantity of heat necessary to raise or lower the temperature of the element the specified number of degrees plus that required for the latent heat of transformation.

In operation, hot water at 210° F is supplied from heat source 54 to reservoir H1, emptied into chamber 18 when the valve opens, and again emptied into reservoir H2 (lower) when the stroke is completed and the lower valve opens. The pump transfers the water from lower to upper H2 (next chamber) and hot water thus flows through the series of H reservoirs to H7 and thence to the cooler 56 where its temperature is reduced from 120° F to 90° F. Thereafter the water from 56 becomes the cooling or heat abstracting water that passes through the system in reverse from C1 to C7. After the C7 reservoir the cooling water passes again through heat source 54 to renew the cycle by raising the water temperature from 180° F to 210° F in the heater. The whole system of chambers, reservoirs, pumps, and tubing should, of course, be well-insulated to keep heat losses low.

An engine of this type can operate quite efficiently on hot liquids and at temperature levels that are impractical for other heat engines which usually employ gas or vapor at high pressures and temperatures. The memory engine is quiet, safe and cheap to construct and operate. It can use non-polluting, low-temperature heat sources. There is no special demand for high-temperature strength in materials to withstand high pressures in this engine as is the case for other heat engines capable of these efficiencies. Another most important advantage is that the Nitinol elements can operate a brackish or salt water with negligible corrosion, thus making it ideal for use with geothermal sources.

Obviously many modifications and variations of the present invention may be made in the light of the teachings of the above disclosure. It is therefore to be understood that, within the scope of the appended claims, the invention may be practiced otherwise than specifically described.

What is claimed is:

1. A mechanism for transforming heat energy into mechanical energy comprising:

a plurality of energy transfer elements having a first low temperature, low strength phase and a second higher temperature, high strength phase and formed of an alloy consisting essentially of 55% nickel and titanium remainder titanium said elements when plastically deformed within certain limits by a defined force while in said first phase being capable of being caused by application of heat to assume said second phase and return to initial form with an output of force greater than said defined force;

said elements further, when cooled over a given transformation temperature range (TTR) returning to said first phase;

said elements each having a different transformation temperature range (TTR);

means alternately heating and cooling each said element including an enclosure surrounding each said element and means for alternately and serially introducing hot and cold fluids into each said enclosure in a timed relationship to cause alternate phase changes in adjacent ones of said elements; and means attached to each element for deforming said element while in said first phase and for receiving and utilizing the force output of said element as it changes from said second phase to said first phase.

2. The mechanism of claim 1 wherein: the TTR's of the elements vary in steps of 15° F.

3. The mechanism of claim 2 including means for limiting the load on the mechanism.

4. A mechanism for transforming heat energy into mechanical energy comprising:

a plurality of energy transfer element having a first low temperature, low strength phase and a second higher temperature, high strength phase;

said elements when plastically deformed within certain limits by a defined force while in said first phase being capable of being caused by application of heat to assume said second phase and return to initial form with an output of force greater than said defined force;

said elements further, when cooled over a given transformation temperature range (TTR) returning to said first phase;

said elements each having a different transformation temperature range (TTR);

means alternately heating and cooling each said element including an enclosure surrounding each element and means for alternately and serially introducing hot and cold fluid into each said enclosure in a timed relationship to cause alternate phase changes in adjacent ones of said elements; and means attached to each element for deforming said element while in said first phase and for receiving and utilizing the force output of said element as it changes from said second phase to said first phase.

5. The mechanism of claim 4 wherein:

the TTR's of the elements vary in steps of 15° F.

6. Thermo-engine in which thermal energy is converted into mechanical, rotational energy by an output member, comprising:

a plurality of elongated elements which change their length extension under development of a relative high force, when changing temperature beyond a transition temperature or temperature range while permitting length changes in the opposite direction under exertion of relatively little force, when at a temperature oppositely beyond said transition temperature or temperature range;

means for coupling said elements to said output member, so that the length changes of the elements are translated into rotational movement imparted upon the output member when at least one element changes length under development of said high force, while causing the opposite length change under exertion of force in one other of the elements as at least the one element changes length under development of force; and means for cyclically and alternatingly exposing said elements to heating cooling fluids to obtain temperature changes thereof under rapid traversal of said transition temperature or range in each instance to obtain said length changes in each of said directions wherin the heating and cooling fluids differ in temperature by a value which is a multiple of said transition temperature range.

* * * * *